United States Patent [19]

Adriaensen et al.

[11] Patent Number: 4,788,104

[45] Date of Patent: Nov. 29, 1988

[54] GRANULAR COMPOSITE CONTAINING CRIMPED FIBERS AND PLASTIC ARTICLES MADE THEREFROM

[75] Inventors: Ludo Adriaensen, Deerlijk; Frans Verhaeghe, Kortrijk-Heule, both of Belgium

[73] Assignee: N. V. Bekaert S.A., Belgium

[21] Appl. No.: 44,779

[22] Filed: May 1, 1987

[30] Foreign Application Priority Data

Jan. 30, 1987 [BE] Belgium .................................. 8700067

[51] Int. Cl.$^4$ .......................... B32B 9/00; B32B 15/00; D04H 1/58
[52] U.S. Cl. ..................................... 428/288; 252/500; 252/511; 252/512; 264/104; 264/143; 264/148; 264/174; 428/294; 428/367; 428/372; 428/375; 428/369; 428/378; 428/379; 428/392; 428/359; 428/407; 428/457; 428/922
[58] Field of Search ............... 428/359, 372, 375, 367, 428/378, 379, 389, 288, 294, 457, 392, 922, 407; 264/174, 104, 108, 143, 148; 252/502, 510, 511, 512, 513, 500

[56] References Cited

U.S. PATENT DOCUMENTS

| | | | |
|---|---|---|---|
| 3,022,210 | 2/1962 | Philipps | 264/174 X |
| 3,042,570 | 7/1962 | Bradt | 264/174 |
| 3,702,356 | 11/1972 | Hall | 264/174 X |
| 3,898,113 | 8/1975 | Meyer et al. | 428/294 X |
| 3,974,124 | 8/1976 | Pelham | 428/911 X |
| 4,169,186 | 9/1979 | Tazaki et al. | 428/378 X |
| 4,312,917 | 1/1982 | Hawley | 428/367 X |
| 4,566,990 | 1/1986 | Liu et al. | 524/439 X |
| 4,596,670 | 6/1986 | Liu | 524/439 X |
| 4,664,971 | 5/1987 | Soens | 428/288 |

FOREIGN PATENT DOCUMENTS 2123838 2/1984 United Kingdom .

*Primary Examiner*—Lorraine T. Kendell
*Attorney, Agent, or Firm*—Nixon & Vanderhye

[57] ABSTRACT

This granular composite is obtained by chopping granules from a composite strand which contains at least one bundle of gear crimped fibers embedded in a polymer. The fibers can have reinforcing or electrically conductive properties. The granular composite is mixed with another polymer granulate and softened, whereby the fibers are dispersed in the polymer mass, which is then shaped, for example, by injection molding into plastic articles.

24 Claims, No Drawings

GRANULAR COMPOSITE CONTAINING CRIMPED FIBERS AND PLASTIC ARTICLES MADE THEREFROM

BACKGROUND AND SUMMARY OF THE INVENTION

The invention relates to a granular composite material containing crimped fibers, and to plastic articles made from such material.

In the manufacture and shaping of plastic articles, plastic granules containing additives are often used, whereby these master batch granules are then plastified and mixed intensively with an amount of resin thus forming a viscous mass. This mass can then be shaped into articles by extrusion and/or molding.

In applicant's U.K. Pat. No. 2,150,936, there is described the production of a granular composite containing electrically conductive fibers, e.g., short stainless steel fibers. Such fibers are used for the shaping of thermoplastic articles with antistatic properties or shielding properties against electromagnetic radiation. According to this patent, the content of which is incorporated by reference in the present application, fibers are introduced and uniformly distributed through a plastic by the use of an intermediate granular composite. In addition to conductive fibers, nonconductive fibers, e.g., glass fibers, can also be introduced in the same manner to reinforce the plastic.

Although the dispersion attained according to this patent is good, the injection moulding process conditions must be controlled very accurately. In particular, the shear forces in the warm plastified mass to be injection molded must be controlled to achieve a sufficiently uniform dispersion without excessive fiber breakage. This causes the rate of production to be relatively low.

According to the present invention, a uniform fiber dispersion without significant fiber breakage is achieved under widely varying molding process conditions, such as pressures, temperatures, resin viscosities and throughput, if the fibers in the granular composite are present in an ordered but not too dense packing. This helps to control the gradual release of the fibers by the shear forces occurring during the warm kneading of the granulate and makes this less dependent upon the kind of fiber, its composition, thickness, modulus, etc.

DETAILED DESCRIPTION OF THE INVENTION

A preferred way to realize the voluminous, loose packing in the granular composite according to the invention, is by using a composite plastic strand into which continuous filaments or staple fibers have been embedded as bundles and wherein at least one bundle consists of crimped fibers, preferably gear crimped fibers. This composite strand is then chopped in a per se known manner into composite granules of desired length, e.g., from 3 to 15 mm, whereby the fibers predominately run from one end of the granule to its opposite end. Such granular composite is then mixed in the desired ratio with ordinary resin granules, whereupon the mixture is hot kneaded and shaped into articles with a uniform distribution of the fibers through the entire article or through predetermined parts of the article.

Gear crimped fibers offer the excellent advantage of allowing a highly permanent shape of crimping wave with an accurately controlled degree of crimp or voluminosity by an appropriate choice and adjustment of the intermeshing gears. Stuffer box crimping, air jet crimping (Taslan), false twist and edge crimping lead to a high voluminosity, but the regularity of the crimp and particularly the entangling of adjacent filaments can generally not be avoided.

Gear crimping is known per se. The more or less regular wave introduced into the bundles by the gears is converted into a permanent crimp by a suitable means of fixation. For synthetic fibers this is usually a heat treatment.

Metal fibers, e.g., stainless steel fibers, can be advantageously crimped using gears according to applicant's copending application Ser. No. 039,951, filed Apr. 20, 1987. Straight bundles of metal fibers can also be crimped by impregnating said bundles with resin and applying gear crimping to the stiffened bundles and fixing the bundles at an elevated temperature before winding. Straight bundles of glass or carbon fibers can be processed in the same way. A number of the composite bundles thus obtained can be subsequently combined to form a strand by sheathing them with a plastic coating as will be described below.

A regular crimp can also be obtained by knitting (e.g., simple warp knitting) followed by a fixation of the knitted fabric to form a durable crimp in the bundles and by finally unravelling the fixed knitted fabric. It is, however, recommended to use nontwisted fiber bundles regardless of which crimping process is used.

In order to obtain an effective, loose packing of the fibers in the granulate as described above, a simple, almost sinusoidal zigzag crimp in at least one of the fiber bundles may suffice, whereby the wavelength W is between 2 and 30 mm and the amplitude A is chosen between 0.2 and 7 mm such that W/A is larger than 2 and preferably at least 4.

If so desired, a more complicated crimp profile can be used. A planar sinusoidal crimp is, for example, applied in a first stage of gear crimping, whereupon in a second stage, after fixation of the first crimp, the bundle is passed through the nip of a second set of gears. The wavelength and/or the amplitude of the second crimping stage may differ from those of the first stage. Both superimposed crimp waves are of course fixed in a suitable manner. The crimp wave can also result from a larger number of superimposed zigzag crimps. In this way, a definite three-dimensional crimp can be achieved, e.g., when the axes of rotation of at least one set of rear rollers form an angle of e.g., between 30° and 90° with those of a previous set. The limits for both wavelength and amplitude in the case of a more complex crimp profile resulting from the use of several sets of gear roller pairs will preferably be as defined above, whereby W/A will be larger than 2. For the predominant or primary zigzag crimp, W can be between 4 and 20 mm or between 4 and 15 mm, whereupon a second (and if required, a third) zigzag crimp wave with a shorter wavelength is superimposed upon the primary crimp.

It is, however, important to design the crimp in such a way that practically each segment between two subsequent crests in the crimp does not make too large an angle with the neutral axis (main direction) of the crimped bundle. Such excessively large angles, e.g., larger than 45° can result in poor chopping behavior of the strand, because the chopping plane must preferably be as perpendicular to the fiber direction at the chopping point as possible. If this is not the case, there is a risk of producing granules with unravelling fibers at the chopped sections. Angles that are too large, resulting in excessive voluminosity and elasticity, can also cause problems during the embedding of the bundles in the resin to form the composite strand, as will be illustrated in the examples.

The degree of voluminosity (lack of compactness) can be accurately controlled, in particular by combining a number of parallel bundles with different crimp characteristics and possibly different thicknesses into strands. This difference of crimp characteristics can be achieved by selecting the planes of crimp of adjacent bundles so that they are not parallel. It is also possible to shift the crimp wave axially (phase shift) with respect to the crimp in the adjacent bundle. Bundles with different crimp profiles can, of course, be combined, e.g., bundles with different wavelengths and/or amplitudes, W/A ratios, sinusoidally crimped bundles, and three dimensionally crimped bundles. The desired voluminosity in the strand can also be achieved by positioning crimped bundles next to one or more bundles containing almost straight, noncrimped fibers. Such straight and/or crimped bundles can be multifilament bundles or staple fiber slivers. Multifilament bundles and staple fiber slivers can be combined if so desired. Granular composites made from strands incorporating staple fiber slivers usually disperse better. This holds also when these slivers stem from previously crimped filament bundles. Of course, a combination of the above means of controlling the degree of voluminosity can be used as well. Bundles containing gear crimped metal fibers can for instance be combined side-by-side with almost straight carbon or glass fiber bundles since these are more difficult to crimp.

It is also possible to use a combination of gear crimped metal fibers and synthetic fibers (for instance made from low melting polymers) which may be crimped or not, in order to produce granules analogous to the embodiments as described on page 13 of the aforementioned U.K. Pat. No. 2,150,936.

The strand and the composite granule made thereof must contain electrically conductive fibers, as for instance metal fibers or metallized fibers, if the plastic article produced therefrom is to possess antistatic properties, shielding properties against electromagnetic radiation or electric conductivity. Metal fibers with a conductivity of at least 0.5% of the copper standard, as for example stainless steel fibers, are particularly suitable. The fibers preferably have a diameter of at most 15 microns. Carbon fibers and metallized (e.g., nickel coated) carbon fibers are also suitable. The strand may contain bundles of fibers of different conductivities, for instance stainless steel fibers and carbon fibers. A combination of bundles containing conductive fibers with bundles containing nonconductive fibers can also be used. Finally, it may be preferable to incorporate into the strand only nonconductive or poorly conductive fibers, for instance reinforcement fibers such as glass or carbon fibers. The strand contains preferably between 1000 and 35,000 fibers.

In order to obtain a proper dispersion of the fibers into the polymer matrix during the hot molding process, the volume percentage of the fibers in the strand (and thus in the composite granulate derived therefrom) will preferably be between 20 and 80%. The plastic into which the bundles have been embedded to form a strand may have a rather low melt viscosity. The melt viscosity will, for instance, be lower than that of the polymer constituting the main part of the article to be formed and thus of the granular resin to be mixed with the composite granulate according to the invention. Similarly, the melt index of the strand polymer can be chosen at a higher value than the article's main polymer.

If so desired, very finely divided highly polar organic compounds or conductive compounds can be added to the polymer of the strand, as for instance carbon black or metal powder. These encourage the formation of electrically conducting bridges between the adjacent dispersed fibers in the article. Similarly, the addition to the polymer of the strand of certain coupling, bonding or wetting agents, such as for example silanes, titanates and zirconates, can be considered in order to control the adhesion of the fiber surfaces to the polymer matrix into which these fibers are to be dispersed. Finally, the resin impregnated bundles as described above may be extrusion coated with a further polymer layer, which layer may have the same or almost the same composition as the polymer used for the impregnation of the fiber bundles. This additional polymer may in certain cases also have the same or almost the same composition as the main (first) polymer constituent of the plastic article, if for instance polycarbonate resin is used. Similarly, the composition of the impregnating resin of the fiber bundles may correspond to the main polymer of the plastic article and said fiber bundles may be optionally coated with an additional polymer layer.

The strand itself may have a circular or elliptical cross section, or rectangular whereby its width w is larger than its thickness t.

EXAMPLE 1

Several polymer compositions were prepared by mixing various polymer granules with granular composite according to the invention for the injection molding of plastic articles with shielding properties against electromagnetic radiation.

The granular composite was substantially prepared according to the process as described in Example 1 of the aforementioned U.K. patent. Each granule contained about 20,000 continuous stainless steel (AISI 316L) filaments with a diameter of 0.0065 mm embedded into a linear polyester resin (Dynapol ® L850) and coated with a modified alkyd resin with adequate frictional (smearing) properties. The cylindrical composite strand had a diameter of about 2 mm and was chopped into 6 mm long granules. This granular composite was dry mixed with the usual polyphenylene oxide based granulate (Noryl ®) so that the mixture contained 10 wt % (i.e., 1.5 %vol %) metal fibers. It was then extruded using a Samafor 45 extruder into an almost circular strand of 4 mm diameter in which the metal fibers were dispersed. This strand was chopped into 10 mm long granules which were fed to a Stubbe ® injection molding machine as described in Example 6 of the aforementioned U.K. patent. The extrusion nozzle temperature was controlled at 280°–300° C. and the screw speed was 60 rpm. Injection speeds and pressures were as recommended by the resin manufacturer. The injection molded square plaques (150×150 mm) had a thickness of 3 mm.

This process flow was performed on two types of granular composites: one was a conventional granular composite containing a number of straight filament bundles, whereas the other was a granular composite containing the same number of bundles, gear crimped according to the invention. The injection molded plaques with the straight and the crimped fibers had about the same average reflection value R of about 90% at 10 GHz in the far field. They therefore provided about the same shielding against electromagnetic radiation. The plaques containing crimped fibers exhibited, however, a remarkably more uniform dispersion of the fibers than those containing straight fibers.

Each bundle was crimped in the same way in that two zigzag deformations with wavelengths of 7.5 and 5 mm respectively and amplitudes of 1 and 0.7 mm respectively were superimposed. The bundles were assembled and thoroughly impregnated with polyester resin solution, passing, smoothly through the circular stripping orifice and displaying a very good resin take-up. Possibly, the voluminosity of the crimped bundles is responsible for this phenomenon because of the many voids between fibers and sub bundles and also because of a certain degree of elasticity of the sub bundles which prevents breakage when passing through the stripping orifice, which action of course exerts a certain stress and stress resistance on the bundles.

Impregnating a more compact arrangement of straight fibers is found to lead to a much more difficult resin take-up. When passing such bundles through the orifice, they do not yield elastically which leads to more breakage. This causes broken-off fiber bundle ends to accumulate at the orifice or get entangled around the other bundles which prevents an uninterrupted composite strand formation and an easy release of the fibers out of the chopped granular composite.

The improved resin take-up and more voluminous embedding in composite granules also promotes a rapid dispersion of the granulate during hot working.

A too pronounced crimp, on the other hand, has also been found to hamper a rapid impregnation. Then, the impregnated bundles show a tendency to open up in the transverse direction (to expand) after having been passed through the stripping orifice and during the drying stage (stiffening) which endangers the internal cohesion of the composite strand. This also leads to the risk of granules splitting along their longitudinal axes and thus to the formation of irregularly shaped granules.

EXAMPLE 2

Granular composite was made according to Example 1, but with a granule length of 4 mm. The granules were mixed with ABS-granules (Cycolac ® KJBE) to form a master batch with 6 wt % (1 vol %) metal fibers, which was fed directly to the same Stubbe ® injection molding machine to form plaques of 150×150×3 mm. Orifice temperature was controlled at 220°–240° C. and the screw speed was again 60 rpm. Injection pressure and back pressure were controlled as prescribed by the resin manufacturer.

When the granular composite with crimped fibers according to the invention was used, various injection molding conditions invariably led to a better appearance of the injection molded plaques (i.e., a better dispersion) than when granular composite containing straight stainless steel fibers was used. Further with an increased injection pressure, a better dispersion (and thus appearance) was observed for both types of composites. The electromagnetic shielding values determined by reflection measurements as in Example 1, were almost the same: R=85% (at 10 GHz).

In general, it can thus be concluded that crimped fibers lead to a better dispersion and thus to an improved appearance of the molded articles. This last aspect especially is presently gaining more importance. In addition, a better dispersion leads to a more homogeneous composition resulting in articles with more uniform physical, chemical and mechanical properties throughout their mass, which is a highly valued characteristic.

The invention also applies to a granular composite containing a water-soluble resin. Such a granulate will gradually disintegrate when agitated in water or in an aqueous suspension to form a uniform fiber dispersion, which can then be poured onto a permeable sieve to form a fiber mat (i.e., a metal fiber mat) by a wet process. When the aqueous suspension is a paper pulp, a paper with a predetermined content of crimped (e.g., conductive) fibers results which fibers are homogeneously dispersed in the paper sheet. In this instance, it will be advantageous to choose a composite granule length of less than 5 mm and preferable less than 3 mm.

Of course, the invention can also be applied to disperse fibers in thermosetting resins by the use of granular composites, for instance as described in Example 4 of the aforementioned U.K. patent.

While the invention has been described in what is presently regarded as the most practical embodiments thereof, one of ordinary skill in the art will understand that many alterations may be made therein without departing from the spirit and scope of the claims which follow.

We claim:

1. A composite strand for use in the manufacture of plastic articles, said strand comprising fibers embedded as a plurality of bundles in a polymer, wherein at least one of said bundles comprises crimped fibers, and wherein said crimped fibers in said at least one of said bundles possess an almost sinusoidal zigzag crimp with a wavelength W between 2 and 30 mm and an amplitude A between 0.2 and 7 mm and in which W/A is larger than 2.

2. A strand according to claim 1, in which the crimp in said crimped fibers is formed by a plurality of superimposed zigzag deformations.

3. A strand according to claim 2, in which said crimped fibers have a three-dimensional crimp.

4. A strand according to claim 1, in which said strand contains a number of adjacent fiber bundles with different crimp profiles.

5. A strand according to claim 1, in which said strand contains at least one additional bundle of almost straight fibers.

6. A strand according to claim 1, in which said strand contains metal fibers having a conductivity of at least 0.5% of the copper standard.

7. A strand according to claim 6, in which said metal fibers are stainless steel fibers.

8. A strand according to claim 1, in which said strand contains metallized fibers.

9. A strand according to claim 1, in which said strand contains carbon fibers.

10. A strand according to claim 1, in which said strand contains fibers of different electrical conductivities.

11. A strand according to claim 6, in which said strand contains fibers of different electrical conductivities.

12. A strand according to claim 1, in which said strand contains only nonconducting fibers.

13. A strand according to claim 1, in which the volume percentage of fibers in the strand is between 20 and 80%.

14. A strand according to claim 1, in which said polymer has a relatively low melt viscosity.

15. A granular composite obtained by chopping granules from a strand as defined in claim 1, in which the fibers predominantly extend from one end of the granule to the other.

16. A strand according to claim 1, in which said polymer contains finely divided, electrically conducting compounds.

17. A strand according to claim 1, in which said polymer contains at least one coupling agent.

18. A strand according to claim 1, in which said strand contains a number of polymer impregnated fiber bundles coated with an additional polymer layer.

19. A strand according to claim 18, in which the additional polymer layer has the same or almost the same composition as the polymer used to impregnate the fiber bundles.

20. A strand according to claim 1, in which the strand width w is larger than its thickness t.

21. A plastic article obtained by shaping the granular composite defined in claim 15, wherein said plastic article is comprised of a first polymer component and wherein said polymer in which said fibers are embedded is substantially the same as said first polymer component.

22. A composite molding compound to be used for molding plastic articles comprising a mixture of granular composites as defined in claim 15 and another polymer granulate.

23. A plastic article obtained by shaping the compound defined in claim 22, in which the fibers have been uniformly distributed in predetermined parts of the article or in the entire article.

24. A plastic article according to claim 21, wherein said strand contains a number of polymer impregnated fiber bundles coated with an additional polymer layer having the same or substantially the same composition as said first polymer component.

* * * * *